(12) United States Patent
Hernacki

(10) Patent No.: US 7,475,420 B1
(45) Date of Patent: Jan. 6, 2009

(54) DETECTING NETWORK PROXIES THROUGH OBSERVATION OF SYMMETRIC RELATIONSHIPS

(75) Inventor: Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 653 days.

(21) Appl. No.: 11/047,471

(22) Filed: Jan. 31, 2005

(51) Int. Cl.
*H04L 9/32* (2006.01)
*G06F 9/00* (2006.01)

(52) U.S. Cl. .................... 726/2; 726/3; 726/12
(58) Field of Classification Search ............... 726/2–4, 726/11–12, 14–15, 22–25; 713/150, 153
See application file for complete search history.

(56) References Cited

U.S. PATENT DOCUMENTS 6,487,600 B1 * 11/2002 Lynch ..................... 702/229
6,625,734 B1 * 9/2003 Marvit et al. ............... 726/28
7,076,393 B2 * 7/2006 Ormazabal et al. ......... 702/122

* cited by examiner

*Primary Examiner*—Hosuk Song
(74) *Attorney, Agent, or Firm*—Van Pelt, Yi & James LLP

(57) ABSTRACT

Detecting network proxies through the observation of symmetric relationships is disclosed. Network transmission data is analyzed to detect symmetric relationships between network data transmissions. A symmetric relationship is detected with respect to a first network data transmission sent by a first node to a second node if the second node is observed to send or have sent to a third node a second network data transmission that satisfies a prescribed first criterion that it is anticipated the second network data transmission would satisfy if it were used to forward to the third node at least part of the data comprising the first network data transmission. For each symmetric relationship found, further analysis is performed to determine if the second node is configured to serve as a proxy.

27 Claims, 12 Drawing Sheets

[ SOURCE IP, DESTINATION IP, PORT, SIZE, TIME ]

FIG 5

DETECTING NETWORK PROXIES THROUGH OBSERVATION OF SYMMETRIC RELATIONSHIPS

FIELD OF THE INVENTION

The present invention relates generally to computer networks. More specifically, detecting network proxies through the observation of symmetric relationships is disclosed.

BACKGROUND OF THE INVENTION

Organizations and enterprises maintain network security policies to protect against external and internal threats. Network users across various administrative zones may be subjected to different access restrictions dependent upon the organizational responsibilities of the users. For example, hosts in more restricted administrative zones may only be permitted to communicate with hosts within the internal network, or may be so restricted with respect to at least certain network communication protocols, while hosts in less restricted administrative zones may be permitted to communicate with external hosts as well. A user in the more restricted administrative zone may attempt to evade such restrictions by placing a proxy on a host within the less restricted administrative zone. Such a proxy can be used by a host in the more restricted administrative zone to reach external (or other) hosts to which access is otherwise forbidden. Users in more restricted administrative zones who circumvent local network restrictions by establishing proxies in less restricted administrative zones may expose the otherwise secure network to potentially dangerous payloads.

Existing mechanisms for detecting proxies rely on either detecting well-known proxy ports or inspecting protocol content to identify proxy protocols. The former only works in the event that the proxy is using a well-known proxy port and that port is left visible to scanning hosts. However, detection by such techniques can be evaded by running the proxy on an arbitrary port and/or shielding the port on which the proxy is run from unauthorized hosts. The second mechanism requires visibility into the protocol and for the protocol itself to have some property that indicates that it is being used to proxy. Utilizing encryption foils the former, and few protocols indicate that they are actually performing proxy functions. Existing methods for detecting proxies are also unattractive from a deployment point of view. Constant active scanning is very noisy and slow, often setting off numerous other alarms and resulting in only periodic snapshots of the network, which may miss short-lived proxies. Although passive scanning avoids these problems, it requires very widely spread sensors which are costly and problematic to deploy.

Thus, there is a need for a reliable way to detect proxies that is both easy to deploy and is capable of detecting proxies even if various evasion or obfuscation techniques are used.

BRIEF DESCRIPTION OF THE DRAWINGS

Various embodiments of the invention are disclosed in the following detailed description and the accompanying drawings.

FIG. 5 illustrates one embodiment of a data structure of network transmission data that may be exported to a proxy detector.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting network proxies through the observation of symmetric relationships is disclosed. In one embodiment, network transmission data is analyzed to detect symmetric relationships between network data transmissions. A symmetric relationship is detected with respect to a first network data transmission sent by a first host to a second host if the second host is observed to send or have sent to a third host a second network data transmission that satisfies a prescribed first criterion that it is anticipated the second network data transmission would satisfy if it were used to forward to the third host at least part of the data comprising the first network data transmission. For each such symmetric relationship found, further analysis is done to determine if the second host is configured to serve as a proxy.

Figure 1:
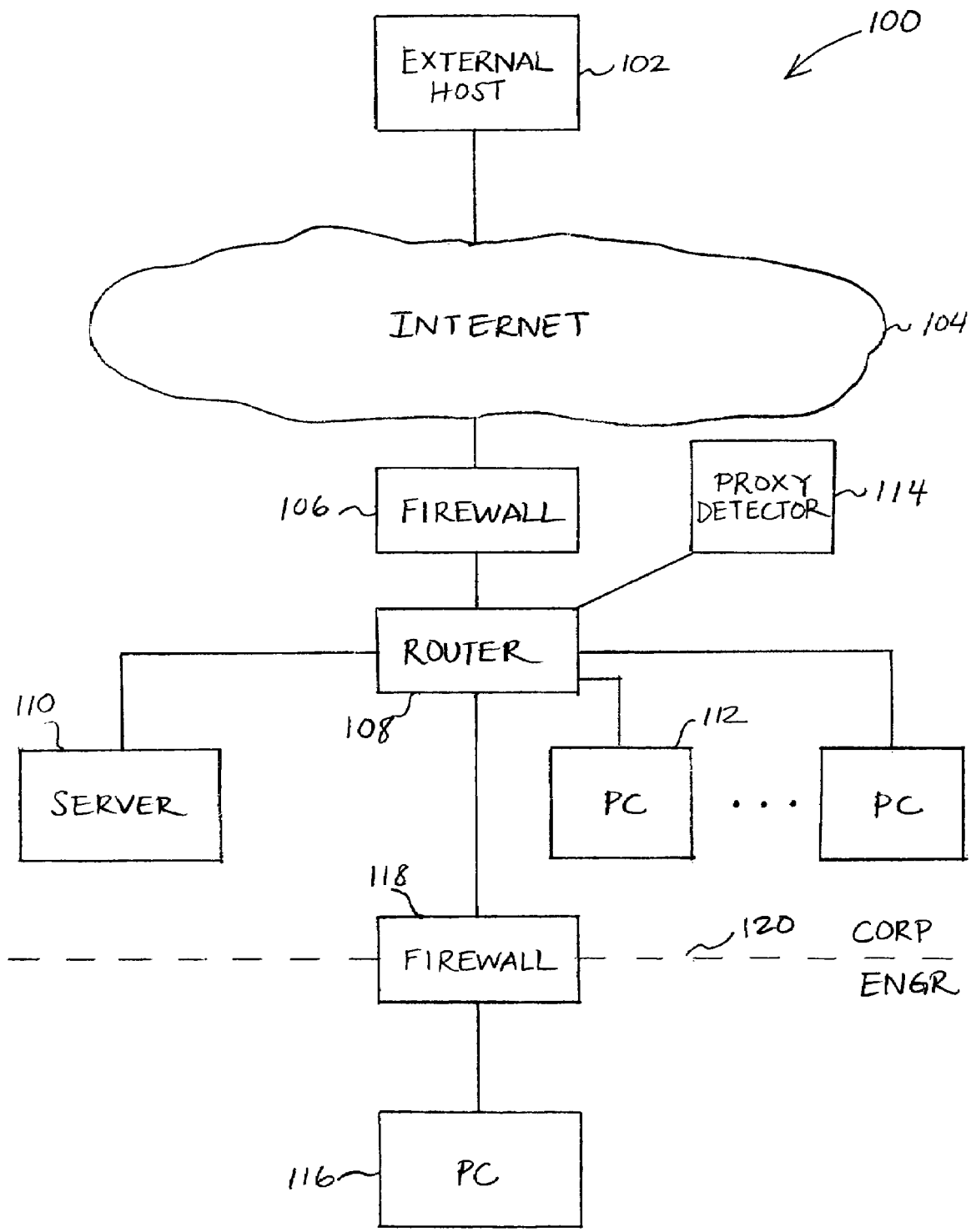
FIG. 1 illustrates a network environment in which a proxy detector is deployed in accordance with one embodiment.

FIG. 1 illustrates a network environment in which a proxy detector is deployed in accordance with one embodiment. The network environment 100 includes an external host 102 connected via a network 104 to a secured network, the boundary of which is defined by a firewall 106. In one embodiment, host 102 is an internal host, network 104 is an internal network or portion thereof, and firewall 106 defines a boundary between administrative zones. A router 108 allows a plurality of internal hosts, such as server 110 and personal computer 112, to communicate with external hosts, such as external host 102, via network 104. A proxy detector 114 receives network traffic monitoring data from router 108. In the example shown, access to external hosts, such as external host 102, is forbidden to internal hosts in the engineering administrative zone, such as personal computer 116. An internal firewall 118 is configured to enforce the prohibition against hosts in the engineering administrative zone accessing external hosts. The internal firewall 118 serves to segment internal hosts, such as 110, 112, and 116, into different administrative zones, as indicated in FIG. 1 by administrative zone boundary 120. Hosts 110 and 112 are within the corporate administrative zone and are permitted to access external hosts, such as external host 102, via network 104 whereas host 116 is within the engineering administrative zone from which such access is forbidden in this example.

Network segmentation is desirable to many organizations to protect against internal and external threats. Consequently, the network may be divided into administrative zones, a particular illustration of which is provided in network environment 100. In this example, the corporate zone is allowed considerable outbound access, but the engineering zone is much more restricted because it may, for example, contain highly valuable intellectual property. Users in the corporate zone are free to browse the web, use instant messaging clients, etc. while their engineering counterparts are blocked from accessing external network 104 by internal firewall 118. A user of a host in the engineering administrative zone may, for example, wish to have access to an external host, such as external host 102, for any number of legitimate or illegitimate reasons, e.g., to be able to purchase items via auction sites, engage in instant messaging with friends, etc. Such users may circumvent local network restrictions by placing an unauthorized proxy on a host within the corporate zone, which thereby allows them to access external hosts. Such a breach of the local security policy may allow external threats such as virus payloads to enter the otherwise secure network. Such a possible breach of security can also be exploited by a malicious insider.

Proxy detector 114 serves to detect unauthorized proxies within the internal network. In the example shown in FIG. 1, proxy detector 114 is represented as an independent unit. In other embodiments, it can be a part of other network security devices such as a network intrusion detection system (NIDS), a network intrusion prevention system (NIPS), a firewall, or even a central management and analysis system.

Figure 2:
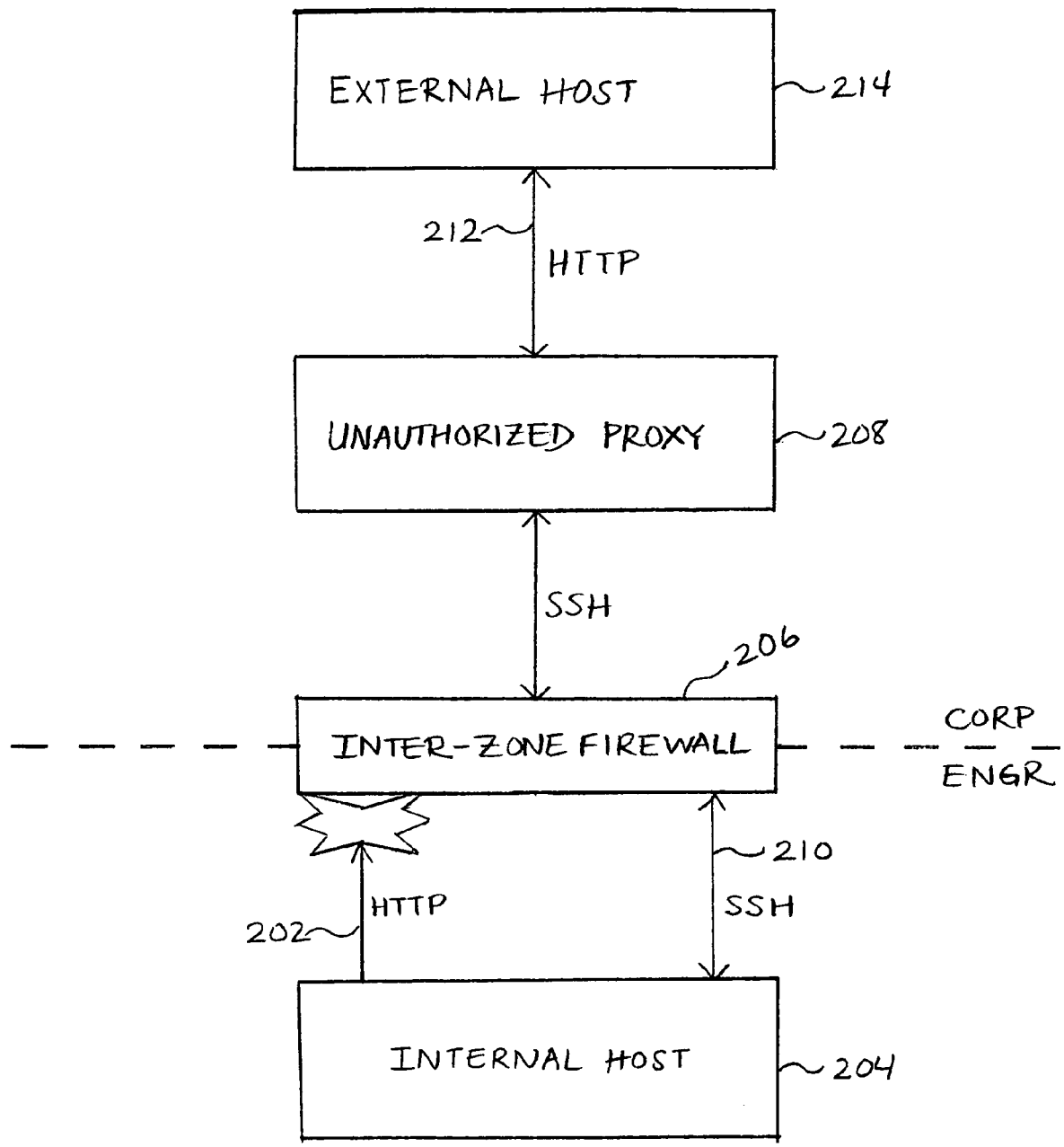
FIG. 2 illustrates an embodiment of an unauthorized proxy configured to enable an internal host in one administrative zone to communicate with a forbidden external host via an unauthorized proxy in a second administrative zone.

FIG. 2 illustrates an embodiment of an unauthorized proxy configured to enable an internal host in one administrative zone to communicate with a forbidden external host via an unauthorized proxy in a second administrative zone. In the example shown, the first administrative zone is designated as an "engineering" administrative zone and the second administrative zone is designated as a "corporate" administrative zone. A direct http request 202 by internal host 204 is blocked by inter-zone firewall 206. Inter-zone firewall 206 segments the local network into distinct administrative zones. In this example, corporate and engineering zones are depicted, with greater access restrictions imposed within the engineering zone by inter-zone firewall 206. In particular, in the example shown inter-zone firewall 206 is configured to block all http traffic from hosts in the engineering administrative zone. In order to overcome the local security policy, a user of internal host 204 within the engineering zone establishes an unauthorized proxy 208 on a host within the corporate zone. Instead of making a direct http request 202 which is blocked by inter-zone firewall 206, the user of internal host 204 embeds the http request within a protocol that allows http payloads to be embedded, such as ssh (the Secure Shell protocol), and tunnels this request via ssh connection 210 through inter-zone firewall 206 to unauthorized proxy 208. Since ssh uses encryption, proxy 208 decrypts the received ssh request, opens an http connection 212 to target external host 214, fetches the content over connection 212, encapsulates the http content in ssh, and transmits it back to requesting internal host 204 through inter-zone firewall 206 over ssh connection 210. Through the use of unauthorized proxy server 208, internal host 204 is able to communicate with forbidden hosts, such as external host 214.

In some embodiments, host 214 may be an internal host to which access may be partially or fully restricted. In some embodiments, the payload tunneled between internal host 204 and proxy 208 may be other than http traffic. In some embodiments, the protocol used for tunneling may be any protocol that allows the payload to be embedded or encapsulated within the protocol.

Figure 3:
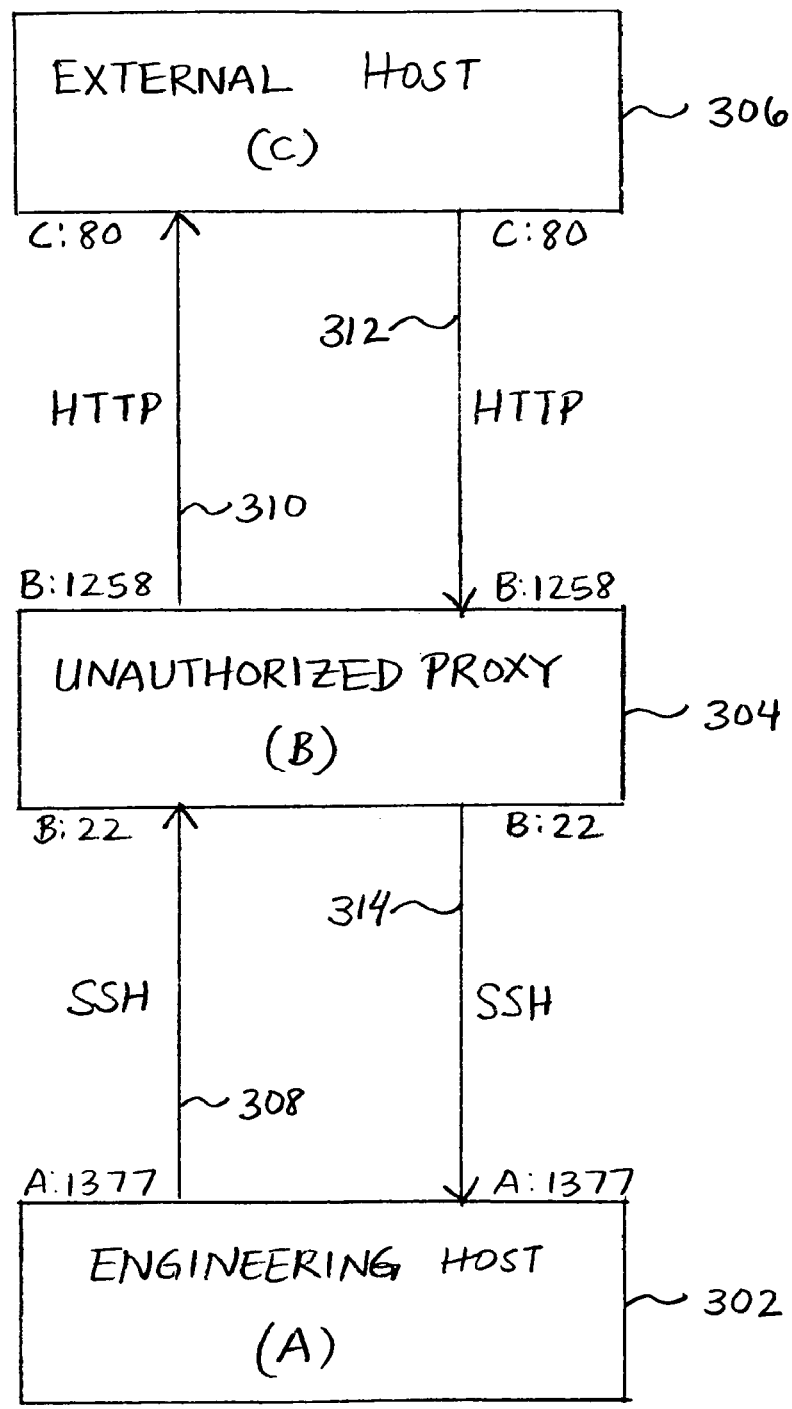
FIG. 3 illustrates an embodiment of an unauthorized proxy and an example of unauthorized network data transmissions using the proxy.

FIG. 3 illustrates an embodiment of an unauthorized proxy and an example of unauthorized network data transmissions using the proxy. For simplicity, in the description below, internal engineering host 302, unauthorized proxy 304, and external host 306 are referred to as A, B, and C, respectively. In this example, Host A uses ssh transmission 308 to tunnel an embedded http request to Host B via an arbitrary source port A:1377. Host A transmits the ssh transmission 308 from port A:1377 to well-known ssh port 22 on Host B, i.e., destination port B:22. Host B decrypts the request and sends an http request 310 to Host C via arbitrary source port B:1258 to well-known http port 80 on Host C, i.e., destination port C:80. Host C responds back to Host B with an http transmission 312 from the same port, C:80, to which request 310 was sent and to the arbitrary port on Host B from which the request 310 to Host C originated, i.e., B:1258. Host B then encrypts the http response and sends it back to Host A through ssh transmission 314. Host B sends the ssh transmission 314 from port B:22 to the arbitrary port on Host A that was used to send ssh transmission 308 to Host B, A:1377. Thus, Host A successfully communicates with Host C by tunneling the request/response through ssh transmissions to/from Host B even though direct communication between Host A and Host C via http is forbidden.

Figure 4:
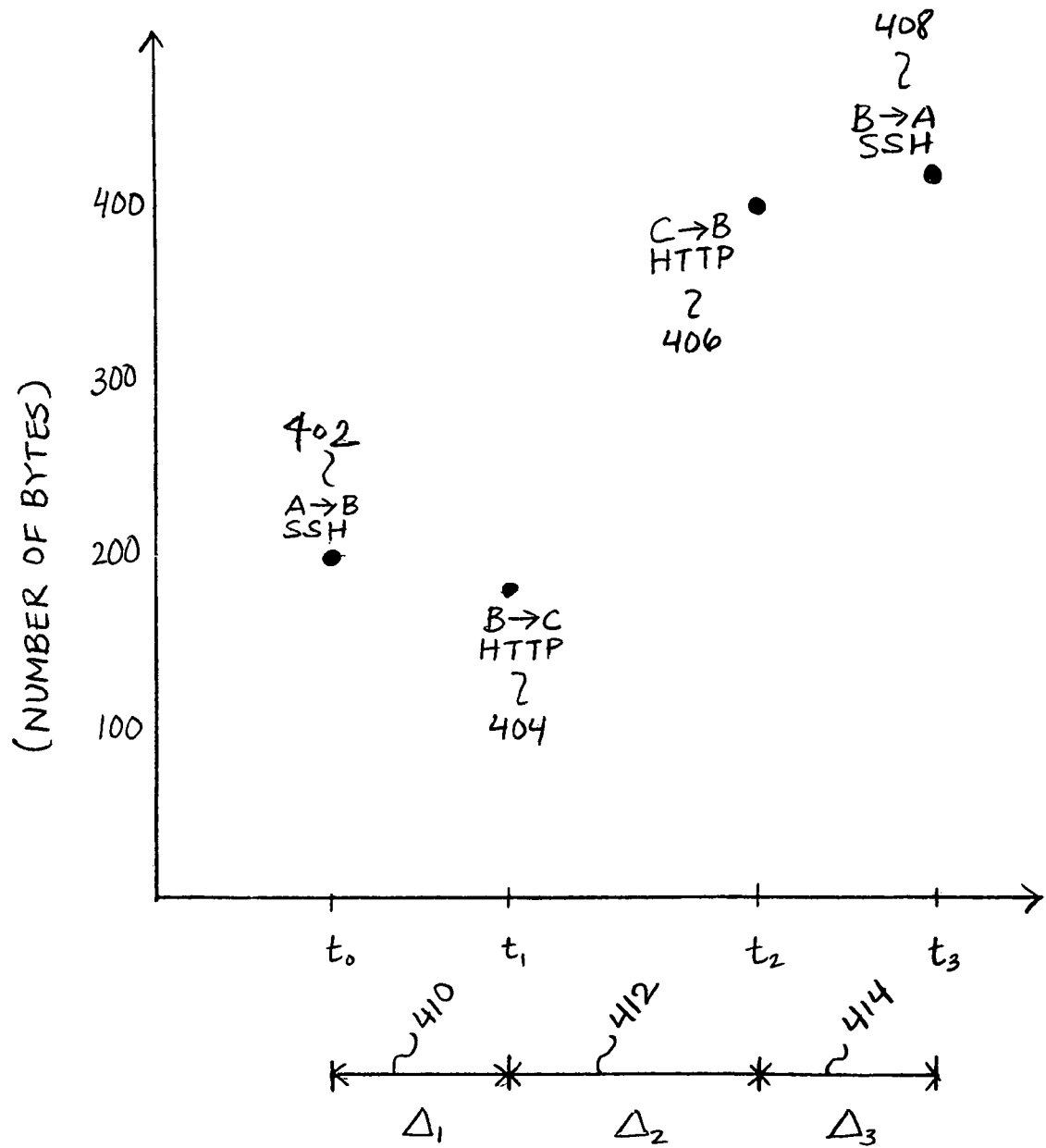
FIG. 4 illustrates examples of size and time relationships of the network data transmissions that are depicted in FIG. 3.

FIG. 4 illustrates examples of size and time relationships of the network data transmissions that are depicted in FIG. 3. For simplicity, network data transmissions 402, 404, 406, and 408 are shown as occurring instantaneously. In one embodiment, transmissions 402, 404, 406, and 408 correspond to transmissions 308, 310, 312, and 314, respectively, of FIG. 3. At time $t_0$, Host A sends to Host B an ssh transmission 402 in which an http request to Host C is embedded. The total size of the transmission from Host A to Host B is 200 bytes. After a time interval $\Delta_1$ (410), Host B transmits at time $t_1$ to Host C the http request 404 (or a variation thereof) that was embedded in ssh transmission 402 from Host A to Host B. The size of the http transmission 404 from Host B to Host C in the example shown is 180 bytes. As illustrated, the transmissions from Host A to Host B and from Host B to Host C are very close in size. The slight discrepancy in size may arise, for example, from headers and/or other portions included in addition to the embedded http request in the ssh transmission 402 from Host A to Host B. Host B removes these headers and/or other portions before transmitting the http request 404 to Host C. Therefore, transmissions A→B and B→C exhibit size symmetry with small error. The time interval $\Delta_1$ between the receipt of the ssh transmission from Host A and the transmittal of the http request to Host C may arise from a variety of factors which depend on Host B, such as the time required to decrypt the received ssh request, latency on Host B, etc. Typically, time interval $\Delta_1$ will be a relatively short interval where, as in the example shown, a request intended for a third node is tunneled via a transmission from a first (originating) to a second (proxy) node. After a second time interval $\Delta_2$ (412), Host C transmits the requested http content back to Host B at time $t_2$ via an http response 406 The size of the http transmission from Host C to Host B is 400 bytes in the example shown and depends on the size of the requested data. After a third time interval $\Delta_3$ (414), Host B tunnels the fetched http content via ssh to Host A at time $t_3$ via ssh transmission 408. The size of the transmission from Host B to Host A is 420 bytes in the example shown. Again, the ssh transmission 408 from Host B to Host A is very close in size to the http transmission 406 from Host C to Host B. Therefore, transmissions C→B and B→A also exhibit size symmetry with small error. In some embodiments, the time intervals 410 and 414 are relatively short and reflect the latency of the unauthorized (or other) proxy on Host B. In some embodiments, the time interval 412 reflects latency on Host C and is also relatively short.

FIGS. 3 and 4 exemplify various characteristics of a network data transmission loop between an internal host (Host A), an unauthorized proxy (Host B), and an external (or other prohibited destination) host (Host C). The depicted network data transmission loop consists of four individual network data transmissions: A→B, B→C, C→B, and B→A. Both pairs of unidirectional transmissions (e.g. A→B, B→C and C→B, B→A) comprise a related pair of unidirectional flows: A→B→C and C→B→A. This pair of unidirectional flows comprises a transmission loop A→B→C→B→A.

In a secure network environment, in some embodiments inbound and outbound network data transmissions to/from hosts in less restricted administrative zones may be monitored to determine if a host in a less restricted administrative zone is being used as an unauthorized proxy to facilitate unauthorized communications between a host on a restricted administrative zone and a host/service with which the host on the restricted administrative zone is not permitted to communicate, e.g., under an applicable network security policy, plan, and/or scheme. Such a proxy server may be recognized by detecting relationships between individual network data transmissions as was explained in relation to FIGS. 3 and 4. Accordingly, an unauthorized proxy server may be detected by observing inbound and outbound network transmission data of an intermediate host and analyzing the data to determine whether the transmissions are related by searching for properties such as reflexivity, size symmetry, port re-use, time proximity, etc.

In some embodiments, a central analyzer node in a network, such as proxy detector 114 in FIG. 1, is used to identify proxies by analyzing network transmission data for symmetric relationships. In one embodiment, in order to identify a proxy, an analyzer searches for reflexive symmetry in pairs of network data transmissions. A pair of transmissions is "reflexive" as used herein if a first transmission is received at a receiving node and the receiving node sends an outgoing second transmission within a relatively short time interval. For example, the transmission 308/402 from Host A to Host B in FIGS. 3 and 4 and transmission 310/404 from Host B to Host C are considered reflexive. In some embodiments, the length of the time interval within which a pair of transmissions must be received/sent in order to be considered reflexive (or potentially reflexive) is preconfigured and/or configurable and is based in some embodiments on knowledge of communication protocols that may be used to tunnel unauthorized requests, host and/or other network equipment characteristics, etc. A pair of transmissions is considered symmetric if the transmissions resemble each other as determined by some predetermined criterion or criteria. For example, in one embodiment, the symmetry metric is based upon size (e.g. packets, octets, etc.). That is, if in a given pair of transmissions, the size of the transmitted data is roughly the same or roughly proportional with some tolerable positive and/or negative error, then the pair of transmissions is considered symmetric with respect to size. For instance, as depicted in FIG. 4, the size of data transmitted from Host A to Host B (e.g. 200 bytes) in transmission 402 is similar with some acceptable error to the size of data transmitted from Host B to Host C (e.g. 180 bytes) in transmission 404. Therefore, the pair of network data transmissions from Host A to Host B and Host B to Host C exhibit size symmetry as defined in some embodiments.

In order to determine whether a proper symmetric relationship exists, it may often be necessary to take into account possible differences in the symmetry metric in a pair of transmissions (e.g. size error). Size differences may arise from the encoding method employed, may be affected by such schemes as compression and expansion, may result from the addition/deletion of headers/labels, etc. In some embodiments, any network data transmission whose size, for instance, falls within an interval whose boundaries are defined by a predetermined error can be considered a candidate for a transmission that satisfies size symmetry. In one embodiment, the maximum allowable error may be determined by a fixed number (e.g. number of bytes) if, for example, the encoding scheme is known. In another embodiment, the maximum allowable error may be prescribed to be a fixed percentage of the size of the network data transmission under consideration. In other embodiments, an appropriate mathematical relationship may be used to determine a value for the maximum allowable error. In some embodiments, a different positive and/or negative error value may be used depending on the encoding and/or protocol used, for example. In some embodiments, successive iterations of the detection analysis may be performed, with the positive and/or negative error value being incremented with each iteration, until either a maximum error value has been reached and/or a symmetric relationship is found.

In addition to looking for reflexivity in network data transmissions, pairs of transmissions can be compared to determine if they are possible parts of the same network data transmission loop by observing port usage. Typical network data transmission loops are characterized by port re-use. More specifically, the ports used between each pair of hosts generally remain the same for both inbound and outbound network data transmissions between the hosts if the transmissions are part of the same connection and/or transaction. For instance, in the transmissions depicted in FIG. 3, Host A and Host B communicate over ports A:1377 and B:22. Similarly, Host B and Host C communicate over ports B:1258 and C:80.

Port re-use between hosts can likewise be used to determine if a pair of unidirectional flows comprise (or potentially comprise) a network data transmission loop. For example, in the environment of FIG. 3, the pair of unidirectional flows A→B→C and C→B→A comprise a transmission loop A→B→C→B→A since both inbound and outbound transmissions between hosts B and C occur over the same ports (e.g. B:1258 and C:80 in FIG. 3).

In some embodiments, an intermediate host is considered to potentially be operating as a proxy if an inbound transmission is received at the intermediate node at one port and the intermediate node then sends to a different port at a further destination an outbound transmission that satisfies criteria for reflexivity and symmetry with respect to the inbound transmission. For example, in the example shown in FIG. 3 transmission 308 was sent to port B:22 on Host B, which subsequently sent transmission 310 to Host C at port C:80. Legitimate services that act as forwarders (e.g. firewalls, SMTP servers, relays, etc.) may resemble a proxy in some respects (e.g. reflexive symmetry, with the forwarding transmission typically being sent shortly after an inbound transmission is received and resembling the received transmission in size and content), but in most cases, all inbound and outbound transmissions from such intermediate hosts have the same destination port, e.g., a destination port associated with the protocol being used by the hosts involved to send the transmission. In the case of a legitimate mail relay, e.g., a sending host would use port 25 (the port number assigned to the Simple Mail Transfer Protocol (SMTP)) on the relay as the destination port, and the relay would in turn also use port 25 as the destination port on the node to which the message is to be forwarded, because the same protocol is used to send the forwarding message. In some embodiments, a relay, even an unauthorized one, may be considered less likely to be of concern because it cannot easily be used to evade security measures put in place to prevent certain hosts from communicating with certain destinations using a prohibited protocol (see, e.g., the example shown in FIGS. 2-4 and described above, in which the inter-zone firewall 206 would prevent a relay being used to relay http traffic from host 204 to external host 214). In some embodiments, to decrease the amount of processing devoted to detecting unauthorized proxies, pairs of transmissions are ignored, even if they otherwise exhibit reflexive symmetry, if the destination port of each transmission is the same, as would be the case as discussed above for a relay but not a proxy. In some embodiments, to reduce the processing required to be performed transmissions to/from nodes known to be authorized proxies and/or relays are ignored, e.g., by listing such nodes on a "white list".

While in a number of the examples described herein an effort is made to detect unauthorized proxies (and/or relays), in some embodiments the techniques described herein may be used to identify unknown or not fully known proxies and/or relays that may or may not be authorized.

In some embodiments, individual network data transmissions must occur within an applicable prescribed interval in order to be considered potentially part of the same network data transmission loop. In some embodiments, pairs of transmissions that are close in time are compared when detecting symmetric relationships (e.g. reflexivity, size symmetry, port re-use, etc.) among a set of network data transmissions. Specifically, in order for a pair of network data transmissions to be a part of the same unidirectional flow, the individual transmissions that constitute the pair should occur within a prescribed interval of one another. As illustrated in FIG. 4, if the time interval $\Delta_1$ between transmission 402 from Host A to Host B and transmission 404 from Host B to Host C is less than or equal to a prescribed threshold interval $\Delta_{TH}$, the pair of transmissions is considered possibly part of the same unidirectional flow, i.e., transmissions 402 and 404 are considered a "reflexive" pair which in some embodiments results in the pair being analyzed further, e.g., to determine if the transmissions are "symmetric", for example if the later transmission is the same size as (or within a prescribed error of the size of) the earlier transmission. Similarly, a pair of unidirectional flows that are related is also generally characterized by time proximity. Thus, with respect to the example illustrated in FIG. 4, in some embodiments the pair of unidirectional flows (e.g. A→B→C and C→B→A) would be identified in some embodiments as potentially related if the time interval $\Delta_2$ between them were less than or equal to a prescribed threshold interval $\Delta_{TH}$, which depending on the circumstances and/or the embodiment may be longer or shorter than the threshold used to identify transmission pairs believed to potentially comprise a related unidirectional flow. However, time proximity is not observed in some situations in which a host may be operating as an authorized or unauthorized proxy or relay, an example of which occurs when a host is temporarily down between transmissions. In some embodiments, the potential for such situations is taken into consideration in setting the time intervals/thresholds and/or observation period.

Figure 5:
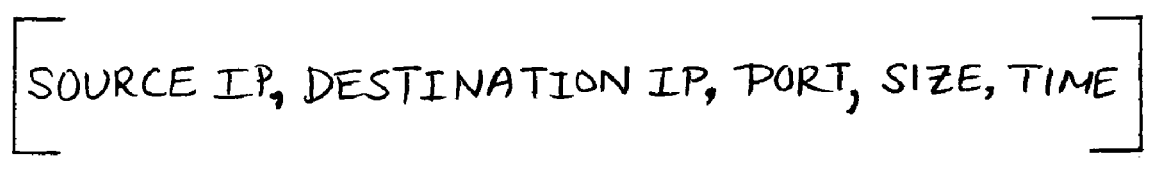

As described above, various properties can be employed to infer relationships among network data transmissions. Network proxies can be detected by analyzing network transmission data for properties such as reflexivity, size symmetry, port re-use, time proximity, etc. In various embodiments, different combinations of such properties may be employed to determine whether symmetric relationships exist among a set of network data transmissions. In one embodiment, network transmission data for such analysis, such as the Cisco® standard NetFlow™ data, can be collected by routers or switches and exported to an analyzer, such as proxy detector 114 of FIG. 1. The collection of network transmission data is simple from a deployment standpoint since many devices already support the export of network transmission data and simply need to be enabled to export such data. Moreover, network transmission data is very lightweight, is very easy to manage, and does not impose much of a performance penalty. Such network transmission data can be either data mined or exported in real time. In alternative embodiments, the requisite network transmission data can be captured by sensors deployed on hosts within the network. FIG. 5 illustrates one embodiment of a data structure of network transmission data that may be exported to a proxy detector. The quintet depicted in FIG. 5 consists of the following five parameters: source IP address, destination IP address, destination port, size, and time. In some embodiments, the source port also is included, e.g., to facilitate determining whether two unidirectional flows comprise a network data transmission loop. Source and destination IP addresses and the time parameter can be used to determine reflexivity while the size can be used to determine size symmetry. In some embodiments the destination port (and/or source port, if included) may be used to filter out relays and/or to determine whether pairs of unidirectional flow are related, i.e., whether they may comprise a network data transmission loop. In other embodiments, if other properties are used to detect symmetric relationships and network transmission data parameters that can be used to identify such properties exist, these parameters can be exported to the proxy detector as well.

Figure 6:
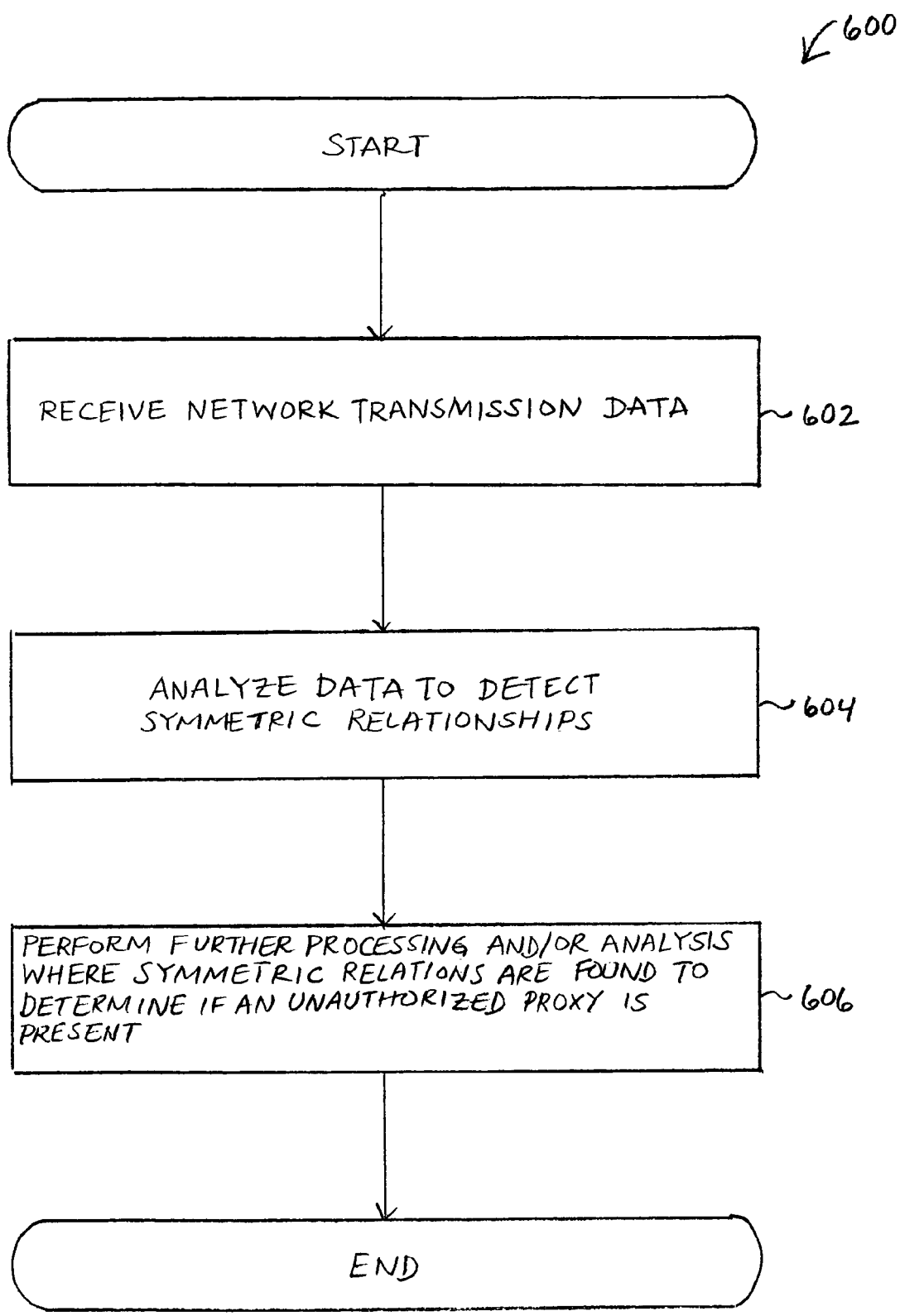
FIG. 6 illustrates an embodiment of a process used to detect unauthorized proxies.

FIG. 6 illustrates an embodiment of a process used to detect unauthorized proxies. In one embodiment, the process 600 of FIG. 6 is implemented on a proxy detector, such as proxy detector 114 of FIG. 1. The processes illustrated in the following figures are described with respect to a proxy detector but are not limited to be used by such a system. At 602 network transmission data is received, such as from the Net-Flow™ function of a router or switch. In 604, the received network transmission data is analyzed to detect symmetric relationships. At 606, further processing and/or analysis is performed where symmetric relations are found to determine if an unauthorized proxy is present.

Figure 7:
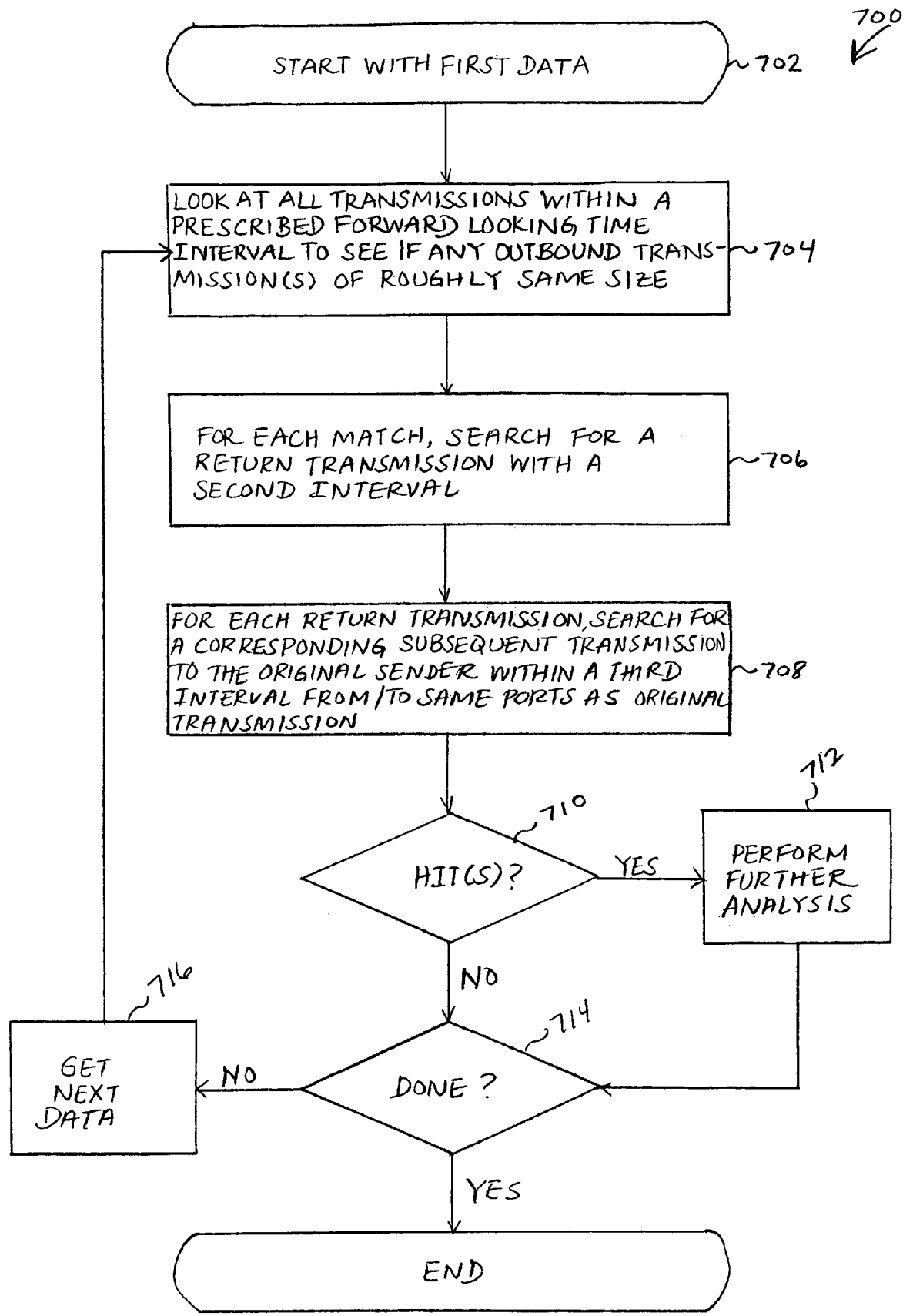
FIG. 7 illustrates an embodiment of a process for analyzing received network transmission data to detect symmetric relationships.

FIG. 7 illustrates an embodiment of a process for analyzing received network transmission data to detect symmetric relationships. In one embodiment, the process of FIG. 7 is used to implement 604 and/or 606 of FIG. 6. In the example shown, process 700 starts at 702 with data associated with a first set of network data transmission, e.g., a set of data associated with a first network data transmission sent by one host to another. At 704, all network data transmissions within a first prescribed forward looking time interval are checked to determine if any outbound network data transmission(s) of roughly the same size as the received data transmission being analyzed were sent by the node that received the received data transmission being analyzed within the first prescribed interval. In the example shown in FIG. 4, for example the transmission 404 would be identified at 704 in one embodiment if the interval $\Delta_1$ were less than or equal to the first prescribed interval and the 20 byte size difference were less than or equal to a predetermined maximum difference in size. For each match found in 704 (i.e., for each outbound transmission within the first prescribed interval that satisfies the applicable size criteria), a return network data transmission to the host that sent the matching outbound transmission (e.g. C→B of FIG. 4) within a second prescribed time interval is searched for at 706. In the example shown in FIG. 4, e.g., the transmission 406 would be identified in 706 if the interval $\Delta_2$ were less than or equal to the second prescribed interval and the transmission 406 satisfied any other applicable criteria, e.g., a criterion requiring that the destination port on the node receiving the return transmission be the same as the source port used by that node to send the outbound transmission 404 before a subsequent transmission would be considered potentially a return transmission to an outbound transmission identified at 704. In 708, for each return network data transmission identified in 706, a corresponding subsequent network data transmission from the host that received the return transmission to the original sender (e.g. B→A of FIG. 4) within a third prescribed time interval is searched for. In the example shown in FIG. 4, e.g., a transmission such as transmission 408 would be identified at 708 if the time interval $\Delta_3$ were less than or equal to the third prescribed time interval. In some embodiments, a transmission is identified in 708 only if it is from/to the same ports as the original network data transmission being analyzed (i.e., the inbound transmission considered at 704). Depending on the embodiment, the first, second, and/or third prescribed intervals may be the same or different lengths. If any hits are found (710), the process advances to 712 in which it is concluded that further analysis is to be performed (e.g., in 606 of FIG. 6). For instance, further analysis may be performed through human intervention, such as by an administrator inspecting the host suspected of being an unauthorized proxy (i.e., the intermediate host, such as Host B of FIGS. 3 and 4, that received the inbound transmission considered at 704). If no hits are found or it has been concluded at 712 with respect to any hits that further analysis is to be performed, it is determined at 714 whether all network data transmissions required to be processed have been analyzed. If additional network data transmissions need to be analyzed, a next set of data is gotten at 716 and 704-714 are repeated, as applicable, with respect to the next set of data. Process 700 ends if all relevant network data transmissions have been analyzed.

Figure 8:
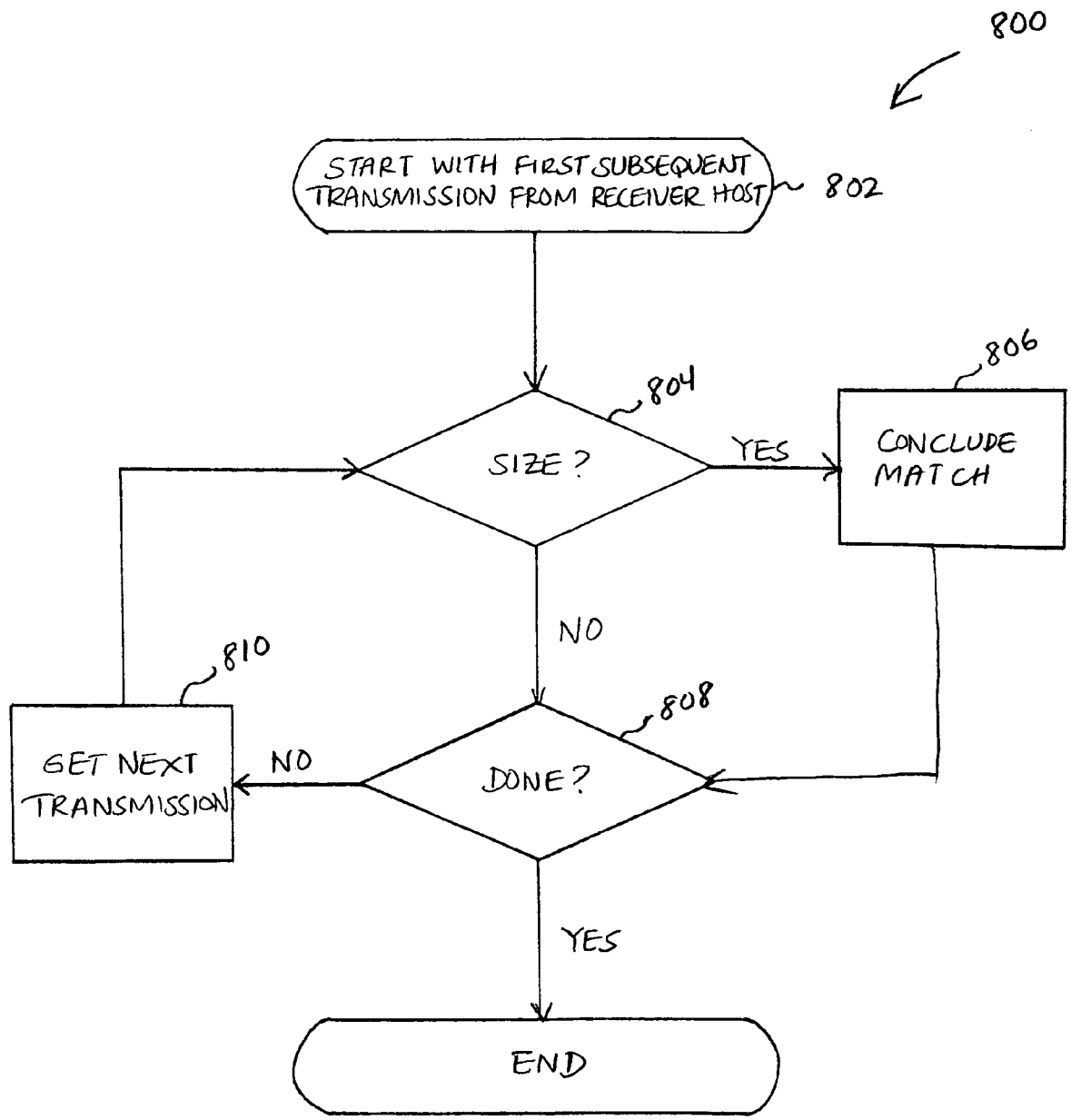
FIG. 8 illustrates an embodiment of a process for finding an outbound transmission that is sent within a prescribed time interval of an inbound transmission and is of a size that is within a prescribed range of the size of the inbound transmission.

FIG. 8 illustrates an embodiment of a process for finding an outbound transmission that is (1) sent within a prescribed time interval of an inbound transmission and (2) of a size that is within a prescribed range of the size of the inbound transmission. In some embodiments, the process 800 of FIG. 8 is used to implement 704 and/or 708 of FIG. 7. At 802, a first iteration of the process is started with respect to a first subsequent network data transmission from the host that received the inbound transmission. In 804, it is determined whether the size of the subsequent network data transmission from the host that received the inbound transmission with respect to which the process of FIG. 8 is being performed is within a prescribed range of the size of the inbound transmission. In the example shown in FIG. 4, e.g., 804 would include with respect to transmission 402 received at Host B from Host A determining whether transmission 404 from Host B to Host C is sufficiently similar in size to transmission 402 and with respect to transmission 406 received at Host B from Host C determining whether transmission 408 from Host B to Host A is sufficiently similar in size to transmission 406. If the size of the outbound transmission being considered at 804 is within a prescribed range of the size of the corresponding inbound transmission to the host that sent the transmission being considered at 804, then it is concluded at 806 that a possible match has been found, i.e., that the inbound transmission with respect to which the process 800 is being performed and the outbound transmission being considered at 804 may comprise a related pair of transmissions (i.e., a unidirectional network flow), such as the relationship between transmissions 402 and 404 or between transmissions 406 and 408 in the example shown in FIG. 4. If the applicable size criterion/criteria is/are not satisfied (804), or once a match has been found, it is determined at 808 whether all relevant transmissions within the applicable prescribed transmission window have been analyzed. If not, in 810 the analysis proceeds to the next relevant outbound network data transmission and 804-808 are repeated with respect to the next transmission. Note that more than one outbound transmission sent within the prescribed time interval might be found in 804 to satisfy the applicable size criteria with respect to the inbound transmission being considered. In some embodiments, each such potential match is processed further. For example, if an instance of the process 800 is being used to implement 704 for a received transmission, 706 of FIG. 7 would be performed with respect to each match found in 704 as implemented using the process 800. If all relevant network data transmissions have been analyzed (808), process 800 ends.

Figure 9:
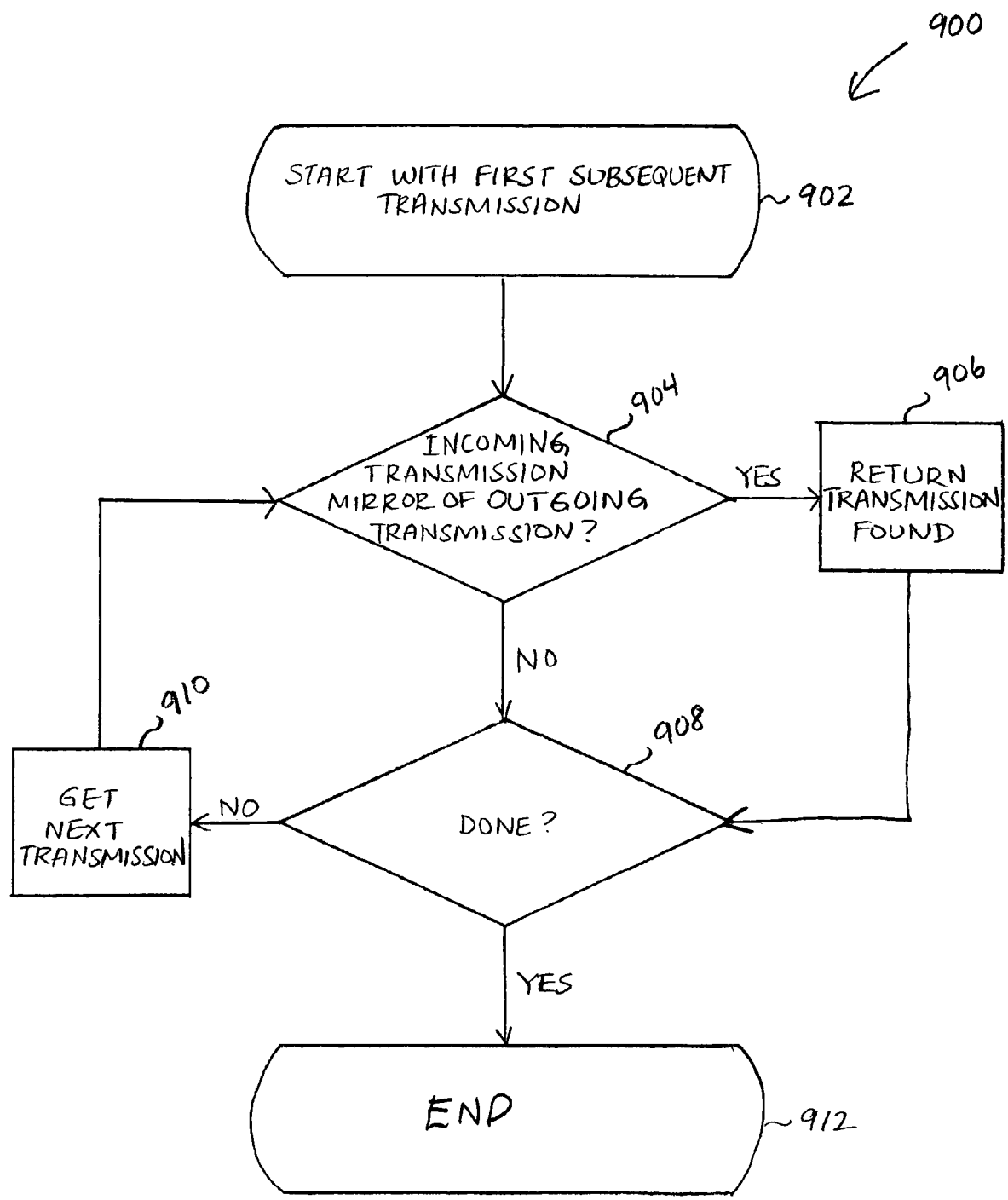
FIG. 9 illustrates an embodiment of a process used to find a return transmission.

FIG. 9 illustrates an embodiment of a process used to find a return transmission. In some embodiments, the process 900 of FIG. 9 is used to implement 706 of FIG. 7. Process 900 starts at 902 with consideration of a first subsequent transmission received by the host that sent the transmission with respect to which a corresponding return transmission is being searched for. In 904, it is determined whether the inbound transmission being considered is a mirror of the outgoing network data transmission with respect to which a return transmission is being searched for. More specifically, it is determined whether the same ports are used for both inbound and outbound network data transmissions (e.g. C:80→B:1258 is the mirror of B:1258→C:80 in FIG. 3). If the incoming network data transmission is a mirror of the corresponding outgoing network data transmission, then at 906 it is concluded that a possible return transmission has been found (e.g. C→B of FIGS. 3 and 4). If it is determined at 904 that such mirroring is not present or if it is concluded in 906 that a possible return transmission has been found, the process advances to 908 in which it is determined whether all relevant network data transmissions within a prescribed transmission window have been analyzed. In some embodiments, more than one subsequently received transmission may satisfy the criteria applied at 904, in which case each such received transmission is identified as a possible return transmission with respect to the outbound transmission with respect to which the process 900 is being performed. If there are one or more additional inbound transmissions to be processed (i.e., one or more transmissions received within the prescribed time window with respect to which an iteration of the process 900 has not yet been performed) (908), at 910 the analysis advances to the next inbound network data transmission received during the prescribed time interval and 904-908 are performed, as applicable, with respect to said next transmission. If it is determined at 908 that all relevant network data transmissions have been analyzed, the process 900 ends at 912. In some embodiments, 912 includes in the event that no inbound transmission considered in 904 satisfied the mirror criteria concluding that no corresponding return network data transmission was found. In some embodiments, such a conclusion results in processing being discontinued with respect to an outbound transmission with respect to which a return transmission was being searched for. For example, in the example shown in FIG. 7 if no return transmission is found in 706 for an outbound transmission identified in 704, 708 and the remainder of process 700 are not performed with respect to that particular match found in 704.

Figure 10:
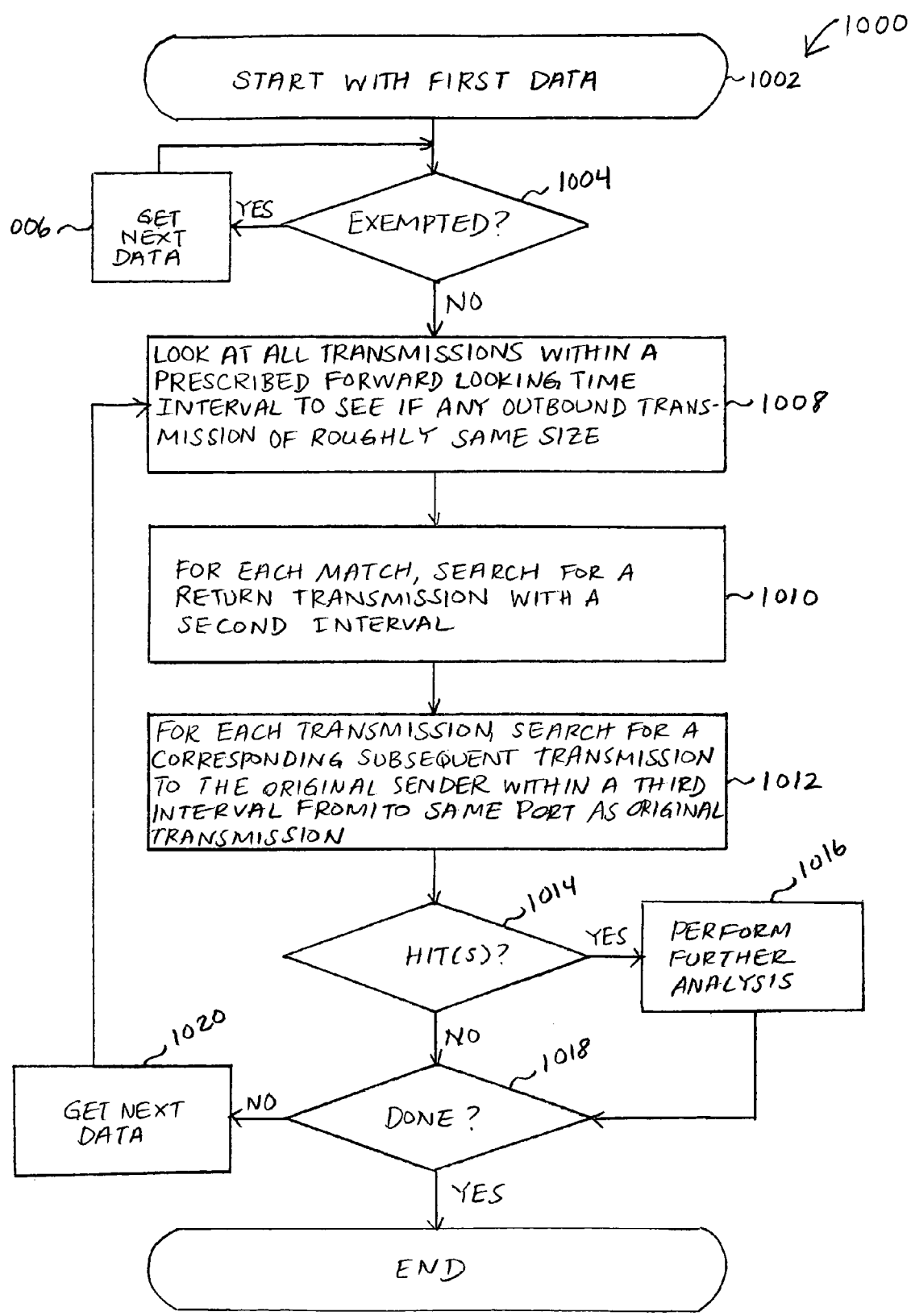
FIG. 10 illustrates an embodiment of a process for analyzing received network transmission data to detect symmetric relationships.

FIG. 10 illustrates an embodiment of a process for analyzing received network transmission data to detect symmetric relationships. The process 1000 of FIG. 10 is similar to process 700 of FIG. 7 with the exception that in process 1000 certain network transmissions are not processed, e.g., because they are associated with a host known to be an authorized proxy or relay. Process 1000 starts at 1002 with the first network data transmission to be processed. It is determined at 1004 whether the network data transmission is exempted. In some embodiments, legitimate services (e.g., known authorized proxies or relays) are exempted, which conserves resources by not requiring further processing of transmissions associated with services and/or systems whose network traffic likely would satisfy the criteria being used to identify unauthorized (or other unknown) proxies but with respect to which it is already known that the services and/or systems are not unauthorized. In some embodiments, a white list of legitimate services, such as mail relays and/or legal proxy servers, is used in 1004 and traffic associated with a host or service on the white list is not processed further. In some embodiments, network transmissions associated with certain ports are exempted from further processing if these ports are white listed. In some embodiments, only traffic that crosses administrative zones is processed further, and all other traffic (i.e., intra-zone traffic) is exempted. If it is determined at 1004 that the network data transmission is exempted, processing advances in 1006 to the next network transmission data and 1004 is performed with respect to said next network transmission data. If it is determined at 1004 that the network data transmission is not exempted, processing advances to 1008 to 1020, which parallel 704 to 716 of FIG. 7, described in detail above in connection with FIG. 7.

Figure 11:
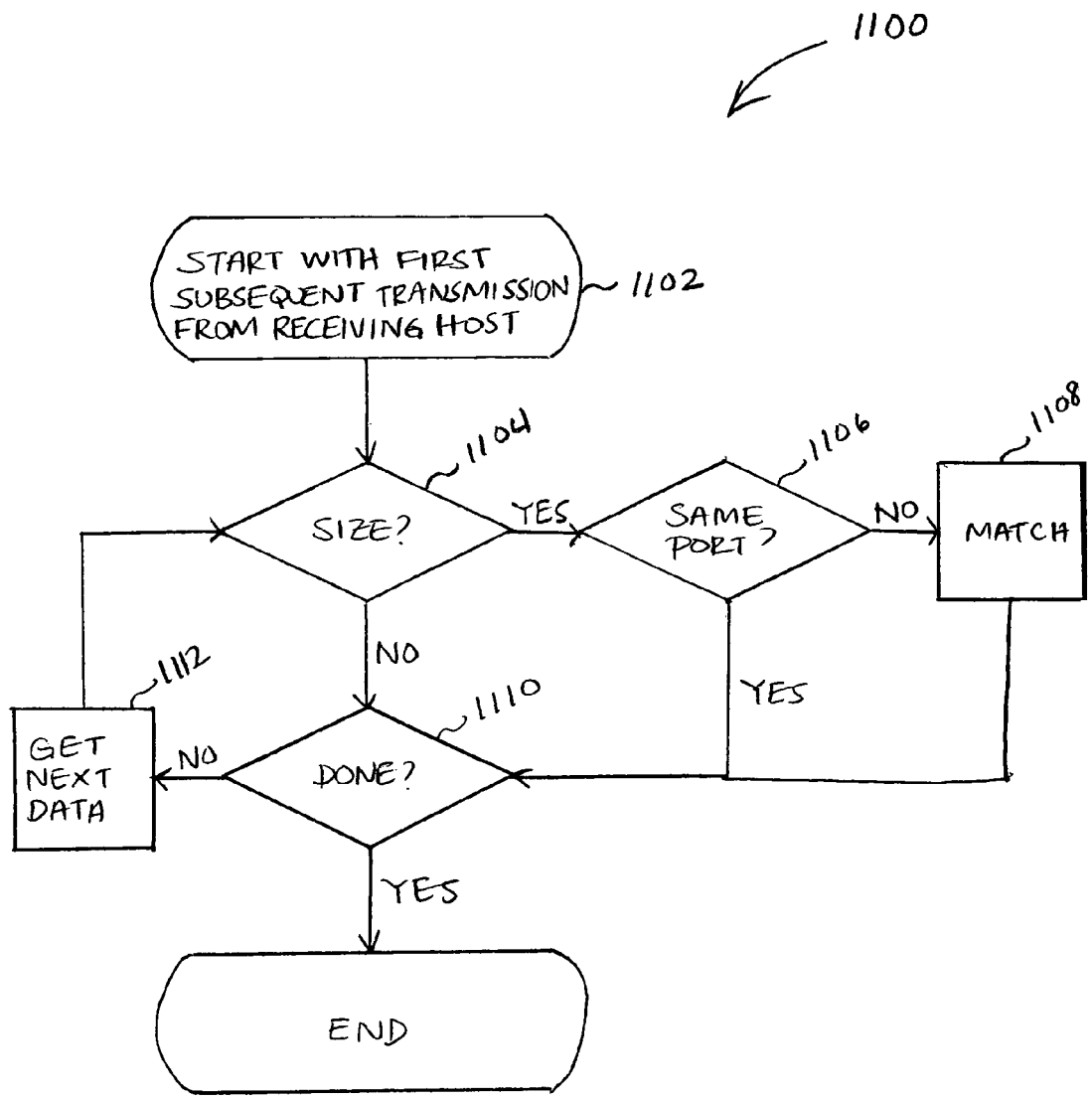
FIG. 11 illustrates an embodiment of a process for finding an outbound transmission that is sent within a prescribed time interval of an inbound transmission and is of a size that is within a prescribed range of the size of the inbound transmission.

FIG. 11 illustrates an embodiment of a process for finding an outbound transmission that is (1) sent within a prescribed time interval of an inbound transmission and (2) of a size that is within a prescribed range of the size of the inbound transmission. In some embodiments, the process 1100 of FIG. 11 is used to implement 704 and/or 708 of FIG. 7 and/or 1008 and/or 1012 of FIG. 10. Process 1100 parallels process 800 of FIG. 8 with the exception that an outbound transmission sent to the same destination port as the port at which the inbound transmission with respect to which the process 1100 is being performed was received is exempted from further processing, such that only outbound transmissions to a different destination port (and that also satisfy the size match criteria) are eligible to be identified as a "match". In this way, only hosts that appear to send a received payload via a different protocol than the one used to send it to the host are processed further. Relays, for example, would not come under suspicion using the approach illustrated in FIG. 1100, because relays typically forward received traffic using the same protocol that was used to send the inbound transmission to the relay. 1102, 1104, 1108, 1110, and 1112 of FIG. 11 correspond to 802, 804, 806, 808, and 810, respectively, of FIG. 8, which are described in detail above. Process 1100 differs from process 800 of FIG. 8 in that at 1106 it is determined whether the destination port of an outbound transmission that satisfies the size criteria applied at 1104 is the same as the port at which the inbound transmission with respect to which the process 1100 is being performed, i.e., the inbound transmission with respect to which a matching outbound transmission is being sought, was received. If the same port was not used, it is concluded at 1108 that a possible match has been found. Otherwise processing advances to 1110 and ends if there are no other outbound transmissions to be processed or continues with processing of the next outbound transmission to be processed, if applicable. Since relays typically communicate via the same ports, 1106 serves to filter out relays.

Figure 12:
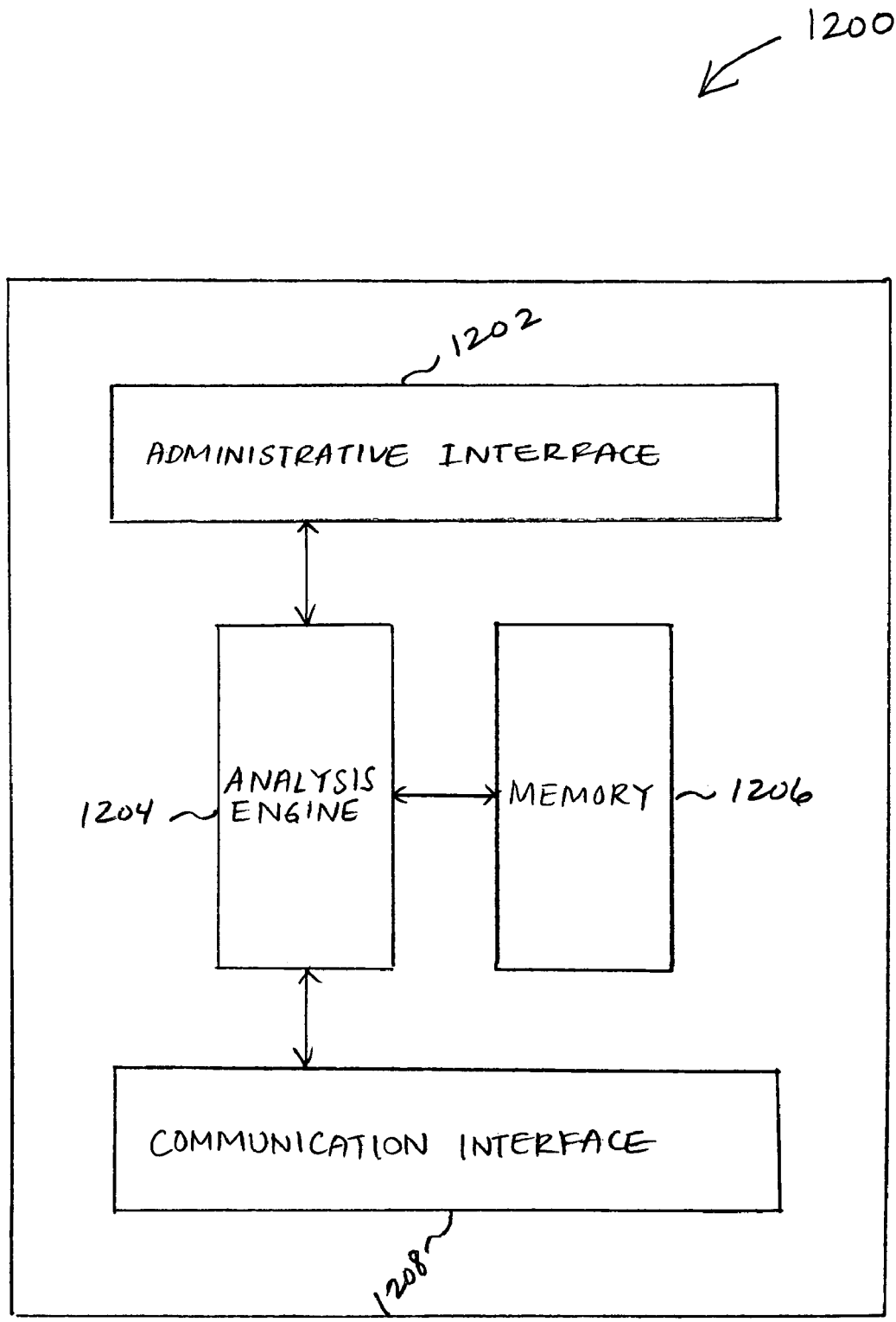
FIG. 12 illustrates an embodiment of a proxy detector.

FIG. 12 illustrates an embodiment of a proxy detector. In some embodiments, the proxy detector 1200 of FIG. 12 is used to implement proxy detector 114 of FIG. 1. Proxy detector 1200 consists of an administrative interface 1202. In some embodiments, the administrative interface 1202 is used to configure the proxy detector 1200, e.g., by prescribing threshold time intervals or other parameters and/or providing a white list of hosts, ports, etc. exempt from processing. The administrative interface 1202 is coupled to an analysis engine 1204 configured to detect proxies by processing network transmission data as described above, e.g., in connection with FIGS. 7-11. Analysis engine 1204 may be implemented in hardware (e.g., an ASIC, a programmable logic device, or other hardware), software (e.g., code running on a special or general purpose processor), and/or firmware. Analysis engine 1204 is coupled to a memory 1206 used in one embodiment to store network transmission data to be processed, configuration information, and/or other data. The analysis engine 1204 is further coupled to a communication interface 1208 used in one embodiment to receive NetFlow™ and/or other network transmission data and/or to send alerts or other communications via a network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting proxies, comprising:
    analyzing network transmission data to detect symmetric relationships between network data transmissions, wherein a symmetric relationship is detected with respect to a first network data transmission sent by a first node to a second node if the second node is observed to send or have sent to a third node a second network data transmission that satisfies a prescribed first criterion that it is anticipated the second network data transmission would satisfy if it were used to forward to the third node at least part of the data comprising the first network data transmission; and for each symmetric relationship found, performing further analysis to determine if the second node is configured to serve as a proxy;

wherein the further analysis comprises determining whether a third network data transmission is or was sent from the third node to the second node in response to the second network data transmission and, if so, determining whether a fourth network data transmission having a symmetric relationship with the third network data transmission is or was sent by the second node to the first node.

2. The method as recited in claim 1, wherein a symmetric relationship is detected only if the second network data transmission is sent by the second node within a first interval after the sending of the first network data transmission.

3. The method as recited in claim 1, wherein the prescribed first criterion is based at least in part on the size of the first network data transmission.

4. The method as recited in claim 1, wherein the prescribed first criterion is satisfied if the size of second network data transmission is within a prescribed range based at least in part on the size of the first network data transmission.

5. The method as recited in claim 1, wherein the prescribed first criterion comprises one of a set of one or more criteria, all of which must be satisfied by the second network data transmission in order for a symmetric relationship to be found.

6. The method as recited in claim 1, wherein the further analysis further comprises:

determining whether said third network data transmission was sent to said from the third node to the second node within a second interval after the sending of the second network data transmission.

7. The method as recited in claim 1, wherein the further analysis further comprises:

determining whether said third network data transmission is or was sent from the third node to the second node using a first source port that is the same as a first destination port to which the second network data transmission was sent and addressed to a second destination port that is the same as a second source port from which the second network data transmission was sent.

8. The method as recited in claim 1, wherein the further analysis further comprises:

determining whether said third network data transmission is or was sent from the third node to the second node using a first source port that is the same as a first destination port to which the second network data transmission was sent and addressed to a second destination port that is the same as a second source port from which the second network data transmission was sent.

9. The method as recited in claim 8, wherein the further analysis further comprises:

determining whether said fourth network data transmission having a symmetric relationship with the third network data transmission is or was sent by the second node to the first node using a third source port that is the same as a third destination port to which the first network data transmission was sent and addressed to a fourth destination port that is the same as a fourth source port from which the first network data transmission was sent.

10. The method as recited in claim 1, wherein the further analysis further comprises:

determining whether the first node resides in a first network zone, the second node resides in a second network zone, and a third node resides in a third network zone;

wherein the first node in the first network zone is permitted to directly communicate with the second node in the second network zone but is forbidden to directly communicate with the third node in the third network zone and the second node in the second network zone is permitted to directly communicate with both the first node in the first network zone and the third node in the third network zone.

11. The method as recited in claim 1, wherein the further analysis further comprises performing further processing with respect to the pair comprising the first and second network data transmissions only if the first node resides in a first network zone and the second node resides in a second network zone.

12. The method as recited in claim 1, wherein the further analysis further comprises performing further processing with respect to the pair comprising the first and second network data transmissions only if the first node resides in a first network zone and the second node resides in a second network zone and the second data transmission was sent under a communications protocol which the first node is forbidden to use to directly communicate with hosts outside the first network zone.

13. The method as recited in claim 1, wherein the further analysis further comprises manually inspecting a host associated with the second node.

14. The method as recited in claim 1, further comprising receiving the network transmission data in real time as the associated network data transmissions are sent.

15. The method as recited in claim 1, further comprising receiving the network transmission data in the form of data recorded at a previous time when the associated network data transmissions were sent.

16. A method for detecting proxies, comprising:

analyzing network transmission data to detect symmetric relationships between network data transmissions, wherein a symmetric relationship is detected with respect to a first network data transmission sent by a first node to a second node if the second node is observed to send or have sent to a third node a second network data transmission that satisfies a prescribed first criterion that it is anticipated the second network data transmission would satisfy if it were used to forward to the third node at least part of the data comprising the first network data transmission; and for each symmetric relationship found, performing further analysis to determine if the second node is configured to serve as a proxy, including by determining whether the first network data transmission was sent from the first node to the second node using a first destination port that is different from a second destination port to which the second node sends the second network data transmission.

17. The method as recited in claim 16, wherein the further analysis further comprises:

filtering the second network data transmission out from any further proxy detection processing with respect to the transmission pair comprising the first and second network data transmissions if it is determined that the first network data transmission was not sent from the first node to the second node using a first destination port that is different from a second destination port to which the second node sends the second network data transmission.

18. A system configured for detecting proxies, comprising:
a communication interface configured to receive network transmission data; and
a processor configured to:
analyze network transmission data to detect symmetric relationships between network data transmissions, wherein a symmetric relationship is detected with respect to a first network data transmission sent by a first node to a second node if the second node is observed to send or have sent to a third node a second network data transmission that satisfies a prescribed first criterion that it is anticipated the second network data transmission would satisfy if it were used to forward to the third node at least part of the data comprising the first network data transmission; and
for each symmetric relationship found, perform further analysis to determine if the second node is configured to serve as a proxy;
wherein the further analysis comprises determining whether a third network data transmission is or was sent from the third node to the second node in response to the second network data transmission and, if so, determining whether a fourth network data transmission having a symmetric relationship with the third network data transmission is or was sent by the second node to the first node.

19. The system as recited in claim 18, wherein a symmetric relationship is detected only if the second network data transmission is sent by the second node within a first interval after the sending of the first network data transmission.

20. The system as recited in claim 18, wherein the prescribed first criterion is based at least in part on the size of the first network data transmission.

21. The system as recited in claim 18, wherein the processor is further configured to determine whether said third network data transmission is or was sent from the third node to the second node using a first source port that is the same as a first destination port to which the second network data transmission was sent and addressed to a second destination port that is the same as a second source port from which the second network data transmission was sent.

22. The system as recited in claim 18, wherein the processor is further configured to determine whether the first network data transmission was sent from the first node to the second node using a first destination port that is different from a second destination port to which the second node sends the second network data transmission, and, if not, filter the second network data transmission out from any further proxy detection processing with respect to the transmission pair comprising the first and second network data transmissions.

23. The system as recited in claim 18, wherein the processor is further configured to perform further processing with respect to the pair comprising the first and second network data transmissions only if the first node resides in a first network zone and the second node resides in a second network zone.

24. A system configured for detecting proxies, comprising:
a communication interface configured to receive network transmission data; and
a processor configured to:
analyze network transmission data to detect symmetric relationships between network data transmissions, wherein a symmetric relationship is detected with respect to a first network data transmission sent by a first node to a second node if the second node is observed to send or have sent to a third node a second network data transmission that satisfies a prescribed first criterion that it is anticipated the second network data transmission would satisfy if it were used to forward to the third node at least part of the data comprising the first network data transmission; and
for each symmetric relationship found, perform further analysis to determine if the second node is configured to serve as a proxy;
wherein the processor is further configured to determine whether within a second interval after the sending of the second network data transmission a third network data transmission is or was sent from the third node to the second node and, if so, determine whether a fourth network data transmission having a symmetric relationship with the third network data transmission is or was sent by the second node to the first node.

25. A computer program product for detecting proxies, the computer program product being embodied in a tangible computer readable storage medium and comprising computer instructions for:
analyzing network transmission data to detect symmetric relationships between network data transmissions, wherein a symmetric relationship is detected with respect to a first network data transmission sent by a first node to a second node if the second node is observed to send or have sent to a third node a second network data transmission that satisfies a prescribed first criterion that it is anticipated the second network data transmission would satisfy if it were used to forward to the third node at least part of the data comprising the first network data transmission; and
for each symmetric relationship found, performing further analysis to determine if the second node is configured to serve as a proxy;
wherein the further analysis comprises determining whether a third network data transmission is or was sent from the third node to the second node in response to the second network data transmission and, if so, determining whether a fourth network data transmission having a symmetric relationship with the third network data transmission is or was sent by the second node to the first node.

26. The computer program product as recited in claim 25, wherein a symmetric relationship is detected only if the second network data transmission is sent by the second node within a first interval after the sending of the first network data transmission.

27. The computer program product as recited in claim 25, wherein the prescribed first criterion is based at least in part on the size of the first network data transmission.

* * * * *